Sept. 28, 1971    G. W. H. KNOCHENHAUER ET AL    3,608,200
INSTRUMENTS FOR MAKING ANGULAR MEASUREMENTS Filed March 3, 1969                              3 Sheets-Sheet 3

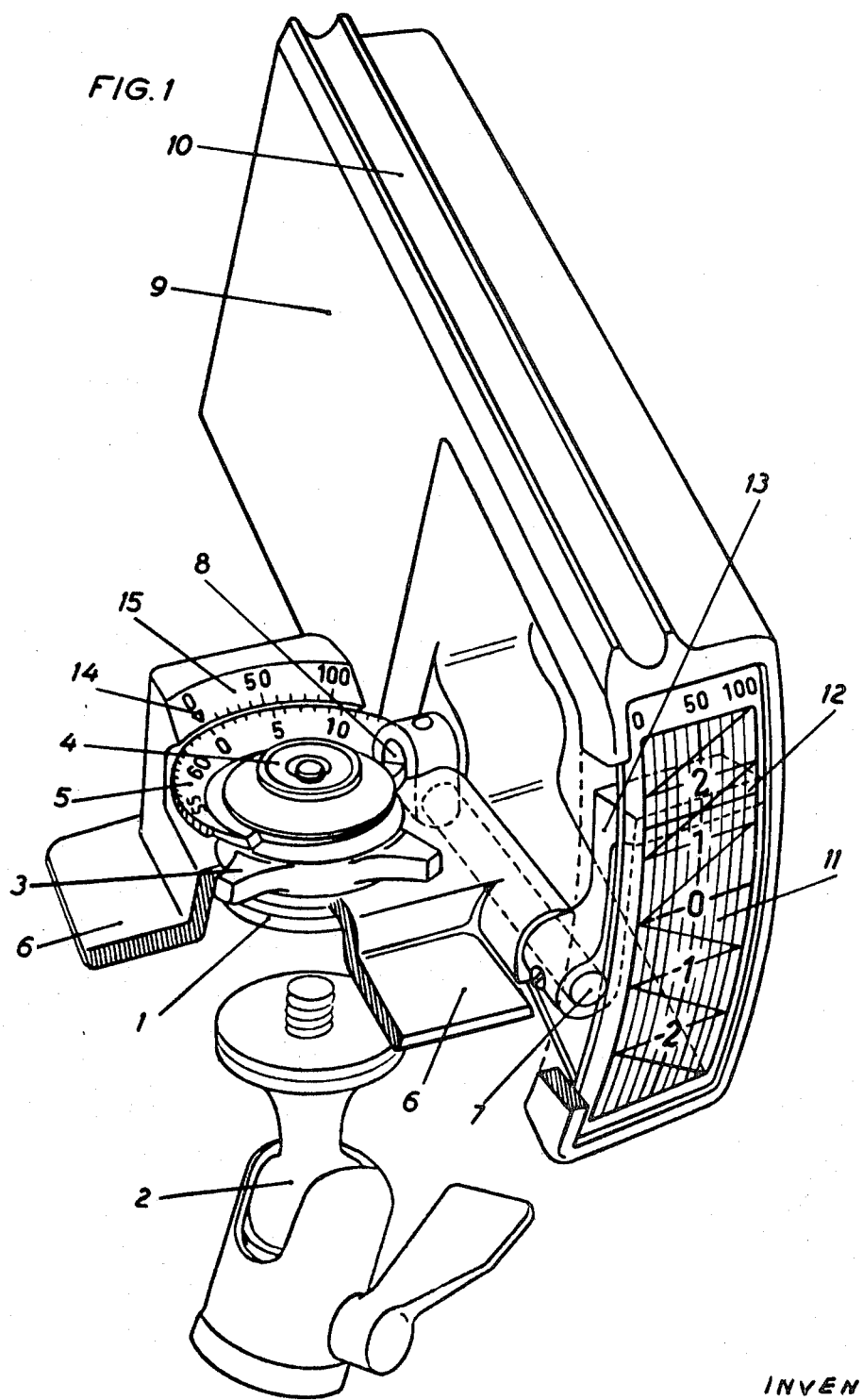

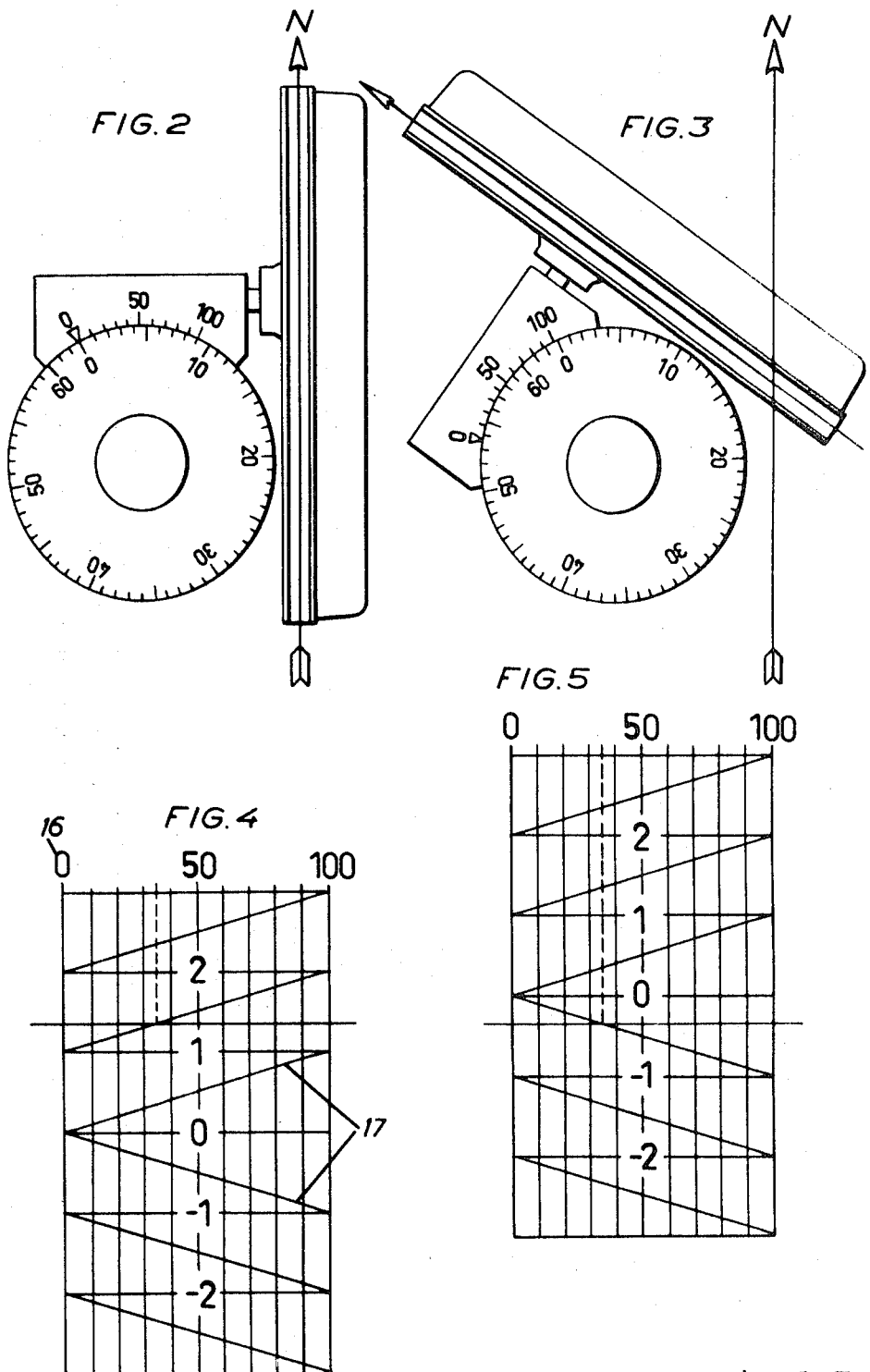

INVENTORS:
GÜNTHER W. H. KNOCHENHAUER
JOHN B. WENELL
Bronson, Schuyler & Bainbridge
ATTORNEYS

United States Patent Office 3,608,200
Patented Sept. 28, 1971

3,608,200
INSTRUMENTS FOR MAKING ANGULAR MEASUREMENTS
Gunther W. H. Knochenhauer, Stockholm, and John Bernhard Wenell, Stocksund, Sweden, assignors to System Paulin AB, Stockholm, Sweden
Filed Mar. 3, 1969, Ser. No. 803,647
Int. Cl. G01c 1/00
U.S. Cl. 33—69
5 Claims

ABSTRACT OF THE DISCLOSURE

An instrument for making angular measurements comprises sighting means for determining vertical angles pivoted to a mounting which turns on a vertical axis having a graduation for determining horizontal angles. The sighting means is associated with a box-shaped protective casing which can be rotated about an axis parallel to the vertical plane through the line of sight so as to serve as a protection for the graduated scales, indexes and bearing means. Besides, the end wall of the casing facing the observer is provided with a graduated scale for vertical angles.

---

This invention relates to an instrument for making angular measurements.

In surveying and gunnery use is made of special instruments for determining the direction in a lateral sense ("bearing") and in a vertical sense ("angle of elevation") from a point of observation to a point in the terrain. To date, use has mainly been made of instruments comprising a bearing scale, a protractor or like element placed on a stand surmounted by a telescope, telescopic sight, sighting rod (when a rough statement is to be made of the height of for instance a tree) or other device for determining heights. Instruments of this kind have all been bulky and it took a long time to set up and read them. In surveying the first requirement is a high exactitude whereas in gunnery it may sometimes be more important that the instrument permits a rapid localization of explosions and other phenomena of short duration. Such an instrument should also be of robust construction and easy to take along, set up and make ready for use.

The present invention relates to an instrument which can be rapidly and sufficiently exactly adjusted. It can be mounted on a stand or like device preferably with the aid of a ball-and-socket joint and it is collapsible such that all sensitive parts will be protected when the instrument is not in use.

The invention thus relates to an instrument for making angular measurements comprising a sighting groove or other sighting means which for determining vertical angles is rotatable about a horizontal axis extending at right angles to the vertical plane through the line of sight, said axis being supported by a baseplate or mounting which in its turn is arranged to rotate about a vertical axis having a graduated scale for determining horizontal angles. The characteristic features of the instrument reside in that the sighting means is associated with a box-shaped casing which can be swung about an axis parallel with the vertical plane through the line of sight so as to serve as a protection for the graduated scales, indexes and bearing means, and that the end wall of the casing facing the observer is provided with a graduated scale for vertical angles.

The invention will now be described in more detail with reference to the accompanying drawing illustrating an embodiment, chosen by way of example, of the instrument.

In the drawings:

FIG. 1 is a perspective view of the entire instrument;

FIG. 2 is a top plan view with the bearing scale zeroized;

FIG. 3 is a top plan view of the instrument with a bearing taken;

FIGS. 4 and 5 are views of the graduated scale for vertical angles, in which two different angles, a positive angle and a negative angle, have been taken;

Figure 6:
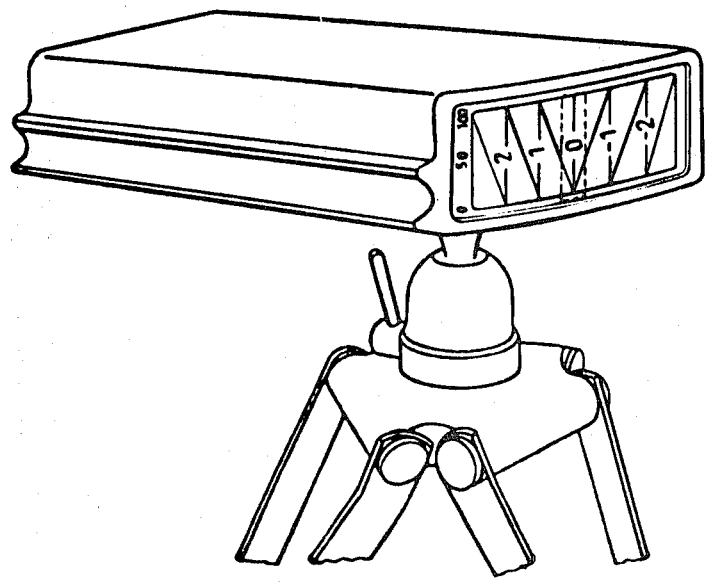
FIG. 6 is a perspective view of the instrument swung into closed position on its stand.

The instrument is box-shaped and consists of two interconnected parts, viz. a baseplate or mounting 6 and a box-shaped protective casing 9. The mounting 6 has a hole through which is passed a main axis 1 formed by a vertical pivot. The main axis 1 at the lower end is internally threaded for connection to a ball-and-socket joint 2 of the type customary in camera tripods. Moreover, the main axis has a spider 3 for use as a handle in tightening the ball-and-socket joint. Mounted at the upper end of the main axis is a box level 4 for checking the vertical setting. The direction of the axis is defined by a line through the ball-and-socket joint 2, the axis 1 proper, the spider 3 and the box level 4. The axis is stationary in the use of the instrument and two parts namely a graduated bearing scale 5 and the mounting 6 proper, are rotatable about said axis with suitable friction. The scale 5 is graduated in angle units suitable for the purpose, for instance gunnery points, and it has an index 14 and a vernier 15 on a stud fastened to the mounting 6. An axis 7 formed by a horizontal pivot is disposed at one side edge of the mounting 6 and a short transitional element carries a horizontal transverse axis 8, formed by a second horizontal pivot and these two axes connect the mounting 6 to the box-shaped casing 9 which can be swung about the axis 8. At the top the casing is a sighting groove 10 which at the swinging movement of the casing 9 moves in a plane at right angles to the axis 8. In the rear end wall of the casing 9 facing the observer there is mounted a transparent curved scale 11 for vertical angles. An upright 13 is mounted on the axis 7. The upright 13 has a lower portion which is perpendicular to the axis 7 and at the top merges in a horizontal arm carrying an index 12. The index 12 is a groove or other suitable marking in the arm, and the index can be illuminated for instance by a light source such as a radio-active preparation.

The instrument described above functions in the following manner:

Aiming of the instrument to a point in the terrain is effected in a single motion by swinging the casing 9 in a vertical and lateral sense so that the sighting groove 10 is aimed at the target. The bearing and the vertical angle or angle of elevation are read each on one of the said scales.

The bearing is read at the index 14. In principle the scale 5 is stationary but it can be rotated into a suitable initial position, for instance as shown in FIG. 2, with the zero line opposite the index when the sighting groove 10 is aimed at a point to the direct north. Thus the instrument is oriented in the terrain, and for each adjustment the direction of the sighting groove, i.e. the bearing towards the point observed in the terrain, is indicated by the index 14 and the bearing scale 5 as long as the adjustment of the latter is the same as in FIG. 2. The accuracy of reading is increased with the aid of a vernier 15. FIG. 3 shows the instrument aimed at an optional point whose bearing can be read at 5385 points.

The scale of vertical angles 11 instead of a vernier has a system of oblique lines for increased accuracy of reading. FIG. 4 shows how the vertical scale axis is roughly divided into intervals of 100 points. The scale is of considerable width and it is divided into equal parts by vertical lines in conformity with a scale 16. A line of reading 17 makes a diagonal in each 100 point field. When the elevation setting is changed the scale moves past the index line 12. The point of intersection between said index line and the line of reading moves laterally and is read on the scale 16.

Since the lines of reading rise to the right above the zero line and sink to the right below said zero line the point of intersection will move to the right at an increase of the numerical values of both positive and negative vertical angles; the scale 16 is applicable in both cases. FIG. 4 shows the appearance of the scale when the vertical angle is +135 points, and in FIG. 5 when the vertical angle is −35 points.

Figure 7:
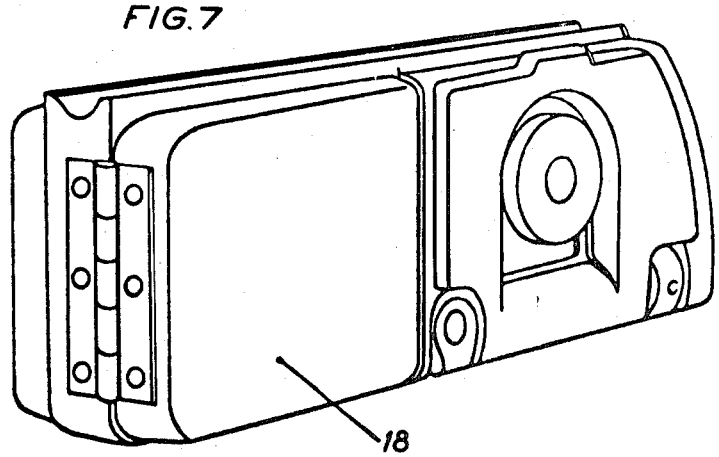
FIG. 7 is a perspective view of the instrument in a closed condition as seen obliquely from below.

The axis 7 which is parallel to the vertical plane through the sight line and which can also lie in said plane permits swinging the casing 9 into a position overlying the mounting 6 whereby the casing will serve as a protection for the graduated scales, indexes and bearing means. FIG. 7 shows the instrument removed from the stand and ready for transport or storage. A door 18 closes a storage space for e.g. a stop watch.

Other embodiments than that described are possible. Thus a telescope, telescopic sight or other sighting means can be substituted for the sighting groove. Moreover, the sighting means or part thereof can be made extensible, swingable, resilient or otherwise movable so that said means will have a greater length when the instrument is set up for use than when it is in order for transport or storage. The instrument can also be designed in such a way that the sight line of the sighting means passes through the axis of the lateral direction, which will entirely eliminate the parallax associated with the instrument described.

Modifications can be resorted to within the scope of the appended claims.

What we claim and desire to secure by Letters Patent is:

1. An instrument for making angular measurements comprising in combination, a base having means for rotating the base about a vertical axis, a casing having sighting means for establishing a line of sight for aiming on an object, means pivotally connecting the casing to the base for movement about a first horizontal axis extending perpendicularly to a vertical plane passing through line of sight, first measuring means including a first scale on said casing for measuring and reading vertical angles to objects sighted upon by said sighting means, said casing having an aperture dimensioned and located to receive said mounting plate, second means pivotally connecting said casing to said base for movement about a second horizontal axis parallel to said line of sight for moving the casing into overlying relationship with said base with the base received in said aperture in the casing, and second measuring means including a second scale on said base for reading bearings of objects sighted upon by said sighting means.

2. The instrument defined in claim 1 wherein said casing has a transparent end wall and a recess adjacent said end wall, and wherein there is further included an index means located in the recess for reading said first scale, and means for securing the index means relative to said base.

3. The instrument defined in claim 2 wherein said second means pivotally connecting said casing to said base includes a horizontal pivot and wherein said means securing said index means is secured to said pivot.

4. The instrument defined in claim 2 wherein said first scale has a vertical scale axis with numbered intervals, and an incline line for indicating intermediary values within each interval, the point of intersection between said inclined line and said index means determining the vertical angle.

5. The instrument defined in claim 4 wherein said first scale further includes a horizontal line having an angular value of zero, and wherein said first scale includes two inclined lines extending in opposite directions above and below said horizontal zero line.

References Cited

UNITED STATES PATENTS

| 1,936,846 | 11/1933 | Leupold | 33—69 |
| 3,066,415 | 12/1962 | Jefferson | 33—69 |

FOREIGN PATENTS

| 190,757 | 1937 | Switzerland | 33—69 |

WILLIAM D. MARTIN, Jr., Primary Examiner